(12) United States Patent
Julien et al.

(10) Patent No.: US 10,005,259 B2
(45) Date of Patent: Jun. 26, 2018

(54) PACKAGING DEVICE FOR A HAIR DYEING PRODUCT

(75) Inventors: Jean-Marie Julien, Marly le Roi (FR); Vincent De La Forcade, Rambouillet (FR)

(73) Assignee: L'OREAL, Paris (FR)

( * ) Notice: Subject to any disclaimer, the term of this patent is extended or adjusted under 35 U.S.C. 154(b) by 375 days.

(21) Appl. No.: 11/298,610

(22) Filed: Dec. 12, 2005

(65) Prior Publication Data

US 2006/0154009 A1  Jul. 13, 2006

Related U.S. Application Data

(60) Provisional application No. 60/637,765, filed on Dec. 22, 2004.

(30) Foreign Application Priority Data

Dec. 10, 2004 (FR) ...................................... 04 52921

(51) Int. Cl.
*B32B 15/08* (2006.01)
*B32B 1/02* (2006.01)
(Continued)

(52) U.S. Cl.
CPC ................ *B32B 15/08* (2013.01); *B32B 1/02* (2013.01); *B32B 7/12* (2013.01); *B32B 15/085* (2013.01);
(Continued)

(58) Field of Classification Search
USPC ..... 428/423.1, 124, 323, 213, 516; 525/184, 525/421, 222; 427/389.9; 508/472;
(Continued)

(56) References Cited

U.S. PATENT DOCUMENTS 3,908,070 A * 9/1975 Marzolf ........................ 428/215
4,190,477 A  2/1980 Ossian et al.
(Continued)

FOREIGN PATENT DOCUMENTS

DE  2 359 399  6/1975
DE  3 843 892  6/1990
(Continued)

OTHER PUBLICATIONS

French Search Report for FR 0 452 921, dated Jun. 13, 2005.
(Continued)

*Primary Examiner* — Ellen S Wood
(74) *Attorney, Agent, or Firm* — Polsinelli PC (57) ABSTRACT

A packaging device comprising:
  i) at least one flexible sheet delimiting at least in part a housing, the flexible sheet forming a multilayer complex (1) comprising:
  a) at least one metal layer (4);
  b) at least one layer of at least one bonding agent (5) comprising a copolymer comprising at least 7% by weight of at least one units chosen from carboxylic units and carboxylate units, wherein the carboxylic units may optionally be in acid form or in salt form, and
  c) at least one layer (6) of a non-metallic material bonded to the at least one metal layer via the at least one bonding agent; and
  ii) at least one cosmetic composition positioned inside the housing.

36 Claims, 2 Drawing Sheets

(51) Int. Cl.
  *B32B 7/12* (2006.01)
  *B32B 15/085* (2006.01)
  *B32B 15/09* (2006.01)
  *B32B 15/20* (2006.01)
  *B32B 27/36* (2006.01)

(52) U.S. Cl.
  CPC .............. *B32B 15/09* (2013.01); *B32B 15/20* (2013.01); *B32B 27/36* (2013.01); *B32B 2274/00* (2013.01); *B32B 2307/41* (2013.01); *B32B 2307/71* (2013.01); *B32B 2307/7242* (2013.01); *B32B 2439/40* (2013.01); *Y10T 428/1352* (2015.01)

(58) Field of Classification Search
  USPC ................................ 156/244.24; 283/59, 91
  See application file for complete search history.

(56) References Cited

U.S. PATENT DOCUMENTS

| | | | |
|---|---|---|---|
| 4,284,672 A | 8/1981 | Stillman | |
| 4,387,126 A | 6/1983 | Rebholz | |
| 5,061,289 A | 10/1991 | Clausen et al. | |
| 5,221,576 A | 6/1993 | Bosc et al. | |
| 5,236,642 A * | 8/1993 | Blemberg et al. | 264/40.7 |
| 5,380,340 A | 1/1995 | Neunhoeffer et al. | |
| 5,534,267 A | 7/1996 | Neunhoeffer et al. | |
| 5,708,151 A | 1/1998 | Möckli | |
| 5,766,576 A | 6/1998 | Löwe et al. | |
| 6,099,592 A | 8/2000 | Vidal et al. | |
| 6,099,593 A | 8/2000 | Terranova et al. | |
| 6,113,927 A | 9/2000 | Hatakeyama | |
| 6,284,003 B1 | 9/2001 | Rose et al. | |
| 6,337,113 B1 | 1/2002 | Muggli et al. | |
| 6,730,789 B1 | 5/2004 | Birault et al. | |
| 6,736,169 B2 * | 5/2004 | De Laforcade | 141/9 |
| 6,880,725 B2 | 4/2005 | De Laforcade | |
| 6,945,402 B1 * | 9/2005 | Gueret | 206/581 |

FOREIGN PATENT DOCUMENTS

| | | |
|---|---|---|
| DE | 4 133 957 | 4/1995 |
| DE | 195 43 988 | 5/1997 |
| DE | 102 40 758 | 3/2004 |
| EP | 0375215 * | 12/1989 |
| EP | 0 375 215 | 6/1990 |
| EP | 0 407 314 | 1/1991 |
| EP | 0 714 954 | 6/1996 |
| EP | 0 770 375 | 5/1997 |
| EP | 0 852 206 | 7/1998 |
| EP | 0 863 812 | 9/1998 |
| FR | 2 733 749 | 11/1996 |
| FR | 2 750 048 | 12/1997 |
| FR | 2 801 308 | 5/2001 |
| FR | 2 830 520 | 4/2003 |
| GB | 1 026 978 | 4/1966 |
| GB | 1 153 196 | 5/1969 |
| JP | 02-169571 | 1/1990 |
| JP | 05-63124 | 6/1993 |
| JP | 2003-081285 * | 3/2003 |
| WO | WO 94/08969 | 4/1994 |
| WO | WO 94/08970 | 4/1994 |
| WO | WO 95/01772 | 1/1995 |
| WO | WO 95/15144 | 6/1995 |
| WO | WO 96/15765 | 5/1996 |

OTHER PUBLICATIONS

English-language Abstract from esp@cenet for DE 102 40 758, published Mar. 11, 2004.
English-language Derwent Abstract for DE 2 359 399, published Jun. 12, 1975.
English-language Abstract from esp@cenet for EP 0 770 375, published May 2, 1997.
English-language Abstract from esp@cenet for JP 02-169571, published Jan. 23, 1990.
English-language Abstract from esp@cenet for WO 94/08969, published Apr. 28, 1994.
English-language Abstract from esp@cenet for WO 95/01772, published Jan. 19, 1995.
English-language Abstract from esp@cenet for WO 95/15144, published Jun. 8, 1995.
English-language Derwent Abstract for JP 05/63124, published Jun. 29, 1993.

* cited by examiner

Fig. 4

PACKAGING DEVICE FOR A HAIR DYEING PRODUCT

This application claims benefit of U.S. Provisional Application No. 60/637,765, filed Dec. 22, 2004, the contents of which are incorporated herein by reference. This application also claims benefit of priority under 35 U.S.C. § 119 to French Patent Application No. 04 52921, filed Dec. 10, 2004, the contents of which are also incorporated herein by reference.

Disclosed herein is a packaging device produced at least in part by means of a sheet forming a multilayer complex which may make it possible to package products which are sensitive to light, to gases, and/or to moisture.

It is known to protect such sensitive products by wrappings. Wrappings which may be mentioned are provided in the form of sheets capable of surrounding these products, whatever their dimensions, wherein these sheets are, for example, arranged so as to form a flexible bag or sachet around the product.

In order to render wrappings of this type impermeable to light, to gases, and/or to vapor, the material from which the wrapping is made should exhibit at least one barrier-forming layer. A barrier-forming layer can be composed, for example, of a metal sheet. As a metal sheet is not able to satisfy all the conditions required for a wrapping material, in practice other layers, such as layers of plastics, may be applied to one face or both faces of the metal sheet. These layers can, for example, be layers put on by extrusion or applied by means of a bonding agent in the form of thermoplastic sheets. These laminated materials, comprising several layers, may make it possible to provide wrapping materials suitable for shaping.

For example, the document EP 0 863 812 discloses a laminated material which comprises a layer of plastic attached by means of a bonding agent to a layer of oriented polyamide (oPA) itself attached by means of a bonding agent to a first side of a sheet of aluminium, the second side of this sheet of aluminium, opposite the first side, being covered with a layer of PVC via a bonding agent. It is known to use specific polymers, such as polyurethanes, as a bonding agent.

U.S. Pat. No. 4,284,672 discloses a laminated material which comprises an outer layer made of biaxially oriented thermoplastic polymer, an intermediate metal layer, and a layer which promotes the adhesion between the metal layer and an inner layer which itself is composed of a polymer which can be heat sealed to itself. The layer promoting the adhesion may be a layer of a copolymer of acrylic acid and of ethylene. The material disclosed in this document may make it possible to obtain very flat wrappings which may thus be easy to transport and which may withstand mechanical stress.

A problem arises in the state of the art when laminated materials are used for wrapping and packaging products such as compositions comprising a basifying agent, for example those comprising aqueous ammonia. This problem may arise, for example, in the field of dyeing keratinous fibers.

This is because, when such air-sensitive, for example oxygen-sensitive, compositions are packaged in sachets produced by means of such laminated materials, delamination inside the sachet may be observed after a storage time of a few weeks. This delamination may be observed, for example, between the layers connected to one another via a bonding agent, such as between the layers of materials positioned on the side of the metal layer facing the product.

This delamination may be reflected by physical separation of the layers of the laminated material, which were initially firmly attached to one another. Another consequence thereof may be the failure of the leak-tightness of the sachet thus formed. This is because this delamination can also be accompanied by fragmentation of the metal layer, and there may be a risk of the product present then flowing out of its packaging; there may also be a risk of the gases, solvents, and/or aromatic materials present therein spreading out of the sachet. And gas permeation may occur, the product then being degraded and rendered unsuitable for use. Under such conditions, the preservation of the product over a long period of time is not guaranteed.

There exists a need for novel laminated materials which can be brought into contact with alkaline solutions, such as solutions having a pH of greater than 7, for example greater than 9, and/or oxidizing solutions, for example laminated materials which can be brought into contact with compositions for dyeing keratinous fibers while guaranteeing the leak-tightness of the wrappings formed from such laminated materials.

Disclosed herein is thus a packaging device comprising:
i) at least one flexible sheet delimiting at least in part a housing, said flexible sheet forming a multilayer complex comprising:
  a) at least one metal layer;
  b) at least one bonding agent comprising a copolymer comprising at least 7% by weight of at least one unit chosen from carboxylic units and carboxylate units, wherein the carboxylic units may optionally be in acid form or in salt form and
  c) at least one layer of a non-metallic material bonded to the at least one metal layer via the at least one bonding agent;
ii) at least one cosmetic composition positioned inside the housing.

As used herein, the term "cosmetic composition" means a cosmetic composition or a compound intended for the preparation of a cosmetic composition.

The present disclosure thus relates to a device for packaging a product comprising at least a first wall delimiting at least in part a housing comprising the product, this first wall being produced from a laminated material comprising at least one structure as layers presented in the following order:
  a) at least one metal layer;
  b) at least one layer of at least one bonding agent comprising a copolymer comprising at least 7% by weight of at least one unit chosen from carboxylic units and carboxylate units, wherein the carboxylic units may optionally be in acid form or in salt form; and
  c) a first outer structure;
said first wall being arranged in such a way that the first outer structure forms an inner face directed towards the inside of the housing suitable for being brought into contact with said product.

Such a laminated material may make it possible, for example, to obtain wrappings which may be more resistant to delamination between the metal layer and the outer structure, which is optionally made of plastic, in contact with the product present in the wrapping, even if the latter is brought into contact with an alkaline and/or oxidizing composition.

As used herein, the term "copolymer" denotes a polymer obtained by polymerization of at least two monomers. In fact, it encompasses copolymers (often regarded as including two polymerized monomers), terpolymers (three polymerized monomers), and tetrapolymers (four polymerized monomers).

In certain embodiments, the carboxylate unit is chosen from acrylate units and methacrylate units. In at least one embodiment, this acrylate unit is ethyl acrylate.

In certain embodiments, the carboxylic unit is chosen from acrylic acid and methacrylic acid.

In at least one embodiment, the copolymer comprises at least one second monomer exhibiting an alkylene unit, the alkyl chain of which comprises from 2 to 10 carbon atoms.

In certain embodiments, the at least one bonding agent can be a copolymer of ethylene and of ethyl acrylate. Alternatively, the at least one bonding agent can be a copolymer of ethylene and of acrylic acid.

In certain embodiments, the at least one bonding agent comprises at least one unit chosen from acrylic acid and acrylic ester units present in an amount ranging from 7% to 19%, such as from 8% to 11%, from 8.5% to 10.5%, or 9.7%, by weight relative to the total weight of the at least one bonding agent.

The at least one layer of non-metallic material may form a first outer structure. It may, for example, be made from a thermoplastic, such as a polymer, for example from polyethylene. The at least one metal layer can be made, for example, of aluminium or of an alloy comprising aluminium.

According to one embodiment disclosed herein, the at least one flexible sheet exhibits a thickness ranging from 70 to 232 μm, such that the at least one metal layer has a thickness ranging from 6 to 25 μm, for example 12 μm, the layer of at least one bonding agent has a thickness ranging from 10 to 40 μm, for example 25 μm, and the layer of at least one non-metallic material has a thickness ranging from 40 to 150 μm, for example 75 μm.

In certain embodiments, the multilayer complex, referred to as laminated material, can comprise a second outer structure chosen, for example, in order to mechanically protect at least the metal layer, this second outer structure being attached to the metal layer so as to form an outer face directed towards the outside of the housing. It can be made of a thermoplastic, such as a polymer, for example from poly(ethylene terephthalate).

According to at least one embodiment, the second outer structure is firmly attached to the metal layer via a layer of a second bonding agent, such as a polyurethane-based adhesive. In certain embodiments, this layer of second bonding agent may have a thickness ranging from 2 to 5 μm, for example 4 μm, the second outer structure having a thickness ranging from 10 to 25 μm, such as 12 μm.

According to one embodiment, the multilayer complex of the at least one flexible sheet is obtained by laminating. For example, the at least one bonding agent can be extruded.

The at least one flexible sheet may be at least in part deformable elastically; it may be produced so as to exhibit a degree of flexibility, for example, to be able to be folded over itself without splitting the layered structure of the material constituting it.

According to one embodiment, the device comprises a bottom part exhibiting a housing capable of receiving the said product, this bottom part being closed off by the flexible sheet, for example sealed over one side of this bottom part, in order to delimit the housing.

In another embodiment, the device disclosed herein is provided in the form of a sachet comprising at least one second wall sealed to the flexible sheet forming a first wall in order to delimit the housing inside which the product is enclosed, this second wall optionally being produced from the same material as the flexible sheet.

In certain embodiments, the packaging device is equipped with a dispensing means which may allow dispensing the product enclosed in the device. For example, this dispensing means can be an airless pump.

According to one embodiment, the product present in the housing is an alkaline composition. For example, the product present in the housing may be a composition comprising at least one basifying agent. This at least one basifying agent may be chosen from aqueous ammonia, ethanolamine, and sodium silicate. Furthermore, the alkaline composition can additionally comprise at least one oxidation base and optionally at least one coupler. The composition can also comprise at least one direct dye.

Another embodiment disclosed herein is the use of a packaging device for the leak-tight packaging of an alkaline composition. Also disclosed herein is the use of such a device for the leak-tight packaging of a composition comprising at least one basifying agent, such as a composition comprising at least one of aqueous ammonia and ethanolamine, it being possible for this composition to further comprise at least one oxidation base and optionally at least one coupler and at least one direct dye.

DESCRIPTION OF THE DRAWINGS

Figure 1:
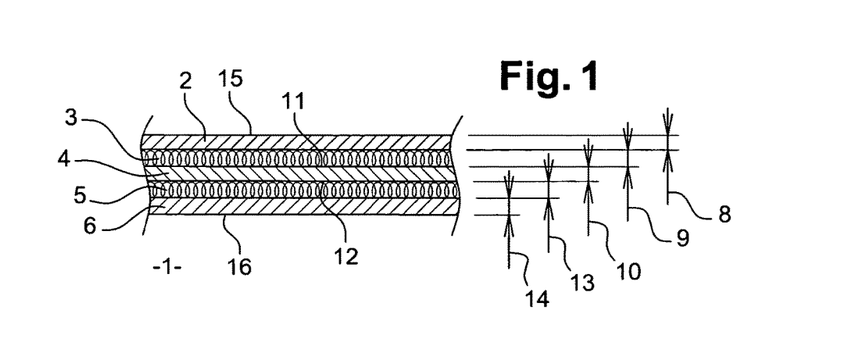
FIG. 1: a view in cross section of a laminated material as disclosed herein.

Embodiments disclosed herein may be better understood on reading the present disclosure and on examining the figures which accompany it. The latter are presented only by way of indication and are in no way limiting of embodiments disclosed herein. The figures show:

FIG. 1 shows a material 1 existing in the form of a sheet cut across its thickness; this material 1 forms a multilayer complex exhibiting a laminated structure comprising at least the following layers superimposed on one another in the following order:

a) a metal layer 4;

b) a bonding agent 5 comprising a copolymer comprising at least 7% by weight of at least one unit chosen from carboxylic units and carboxylate units, wherein the carboxylic units may optionally be in acid form or in salt form; and c) a layer of a non-metallic material forming a first outer structure 6.

In certain embodiments, as this material 1 may be chosen to package a product, the layer of non-metallic material 6 forms a first outer structure 6 suitable for being brought into contact with the product, and the metal layer 4 is furthermore covered with a second outer structure 2 on a side opposite that on which the first outer structure 6 is held.

This second outer structure 2 can be produced from one or more layers, attached to one another, chosen from layers of paper, board, and/or thermoplastics, such as vinyl plastics, for example based on poly(vinyl chloride) (PVC), polyesters, polyolefin plastics, and/or polyamides.

Examples of plastics based on poly(vinyl chloride) (PVC) include but are not limited to vinyl plastics comprising vinyl chloride units in their structure, such as copolymers of vinyl chloride with vinyl esters of aliphatic acids, copolymers of vinyl chloride with esters chosen from acrylic esters and methacrylic acid esters, copolymers of vinyl chloride with acrylonitrile, copolymers of vinyl chloride with diene bonds and unsaturated dicarboxylic acids or their anhydrides, copolymers of vinyl chloride and of vinylidene chloride with unsaturated aldehydes, with ketones, and the like, and polymers and copolymers of vinylidene chloride with vinyl chloride or other polymerizable compounds. Vinyl-based thermoplastics can also be rendered flexible in a way known per se using primary or secondary plasticizers. The PVC sheets can, as the case may be, also be drawn monoaxially (oPVC) or biaxially.

Examples of plastics based on polyesters include but are not limited to poly(alkylene terephthalate)s and poly(alkylene isophthalate)s having alkyl groups comprising from 2 to 10 carbon atoms, which are optionally interrupted at least by one —O—, such as, for example, poly(ethylene terephthalate) (PET sheets), poly(propylene terephthalate), poly(butylene terephthalate) (poly(tetramethylene terephthalate)), poly(decamethylene terephthalate), poly(1,4-cyclohexyldimethylol terephthalate), and poly(ethylene 2,6-naphthalenedicarboxylate). Further examples of plastics based on polyesters are copolymers of poly(alkylene terephthalate) and poly(alkylene isophthalate), the proportion of isophthalate ranging, for example, from 1 to 10 mol %, copolymers and terpolymers, and also block polymers and grafted alternative forms of the abovementioned substances. Other appropriate polyesters, such as poly(ethylene naphthalate), are known in the technical field under the abbreviation PEN.

Other polyesters are copolymers of terephthalic acid and of another polycarboxylic acid with at least one glycol. Copolyesters of terephthalic acid, of ethylene glyco, and of an additional glycol may be mentioned. Glycol-modified polyesters, which are known in the technical field under the name PETG, may also be mentioned.

Appropriate polyesters may be composed of poly(alkylene terephthalate)s having alkyl groups comprising 2 to 10 carbon atoms, optionally interrupted by 1 or 2 —O— groups.

Other polyesters that may be mentioned are poly(alkylene terephthalate)s having alkyl groups comprising 2 to 4 carbon atoms, such as poly(ethylene terephthalate)s. These poly(ethylene terephthalate)s also include A-PET, PETP, PETG, and G-PET.

Examples of polyolefin materials are polyethylenes (PE), for example high density polyethylene (HDPE, density of greater than 0.944 g/cm$^3$), medium density polyethylene (MDPE, density of 0.926 to 0.940 g/cm$^3$), linear medium density polyethylene (LMDPE, density of 0.926 to 0.940 g/cm$^3$), low density polyethylene (LDPE, density of 0.910 to 0.925 g/cm$^3$), and linear low density polyethylene (LLDPE, density of 0.916 to 0.925 g/cm$^3$), for example in the form of nonoriented sheets (PE sheet), monoaxially or biaxially oriented sheets (oPE sheet), polypropylenes (PP), such as axially or biaxially oriented polypropylene (oPP sheet) and cast polypropylene (cPP sheet), amorphous or crystalline polypropylene and mixtures thereof, atactic or isotactic polypropylene and mixtures thereof, poly(1-butene), poly(3-methylbutene), poly(4-methylpentene) and their copolymers, polyethylene with at least one group chosen from vinyl acetate, vinyl alcohol, and acrylic acid, such as, for example, ionomer resins, such as copolymers chosen from copolymers of ethylene, of acrylic acid, of methacrylic acid, of acrylic esters, tetrafluoro-ethylene, and polypropylene, and additionally random copolymers, block copolymers, and olefin polymer/elastomer blends. The polyolefin materials can also comprise cycloolefins as monomer of a homopolymer or of copolymers.

Mention may be made of high density polyethylenes, polypropylenes, and ionomers, for example known under the trade name Surfyn.

Polyamides (PA) for the plastic sheets may be composed, for example, of polyamide 6, ε-caprolactam homopolymer (polycaprolactam); polyamide 11; polyamide 12; ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide); polyamide 6,12, homopolycondensate of hexamethylenediamine and of dodecanedioic acid (poly(hexamethylene dodecanamide)); and polyamide 6-3-T, homopolycondensate of trimethylhexamethylenediamine and of terephthalic acid (poly(trimethylhexamethylene terephthalamide)); and mixtures thereof. The polyamide sheets may be drawn monoaxially or biaxially (oPA).

The second outer structure 2 may be composed of poly(alkylene terephthalate), for example of poly(ethylene terephthalate), so as to improve the impact strength of the material 1 finally produced, for example to improve the resistance to the impact which might be experienced from the outer perimeter of the packaging device at least in part delimited by a flexible sheet forming a first wall produced from this material 1.

The second outer structure 2 may have a thickness 8 ranging from 12 μm to 25 μm.

In certain embodiments, this second outer structure 2 is attached to the metal layer 4 by means of a layer 3 of a second bonding agent produced from appropriate laminating adhesives which may comprise solvents and which may also comprise water. Laminating adhesives, may, for example, be composed of acrylate adhesives which optionally comprise at least one solvent, which may be aqueous, or of polyurethane-adhesive systems. However, it is also possible to use adhesives which cure under the effect of electromagnetic radiation (for example under UV radiation or electron beams). It is also possible to produce this layer 3 from at least one of aliphatic polyesters, diisocyanates, and appropriate lacquers, such as, for example, acrylate-based lacquers, epoxy resins, melamine resins, urea resins, polyurethanes, cellulose nitrate, polyesters, and mixtures thereof. The lacquers, for example, can be solvent-based or aqueous-based and can be systems comprising at least one component. The lacquers can, for example, be cured by drying, thermally, chemically and/or by using radiation (UV; electron beam; IR).

In certain embodiments, the layer 3 is made of polyurethane. It has, for example, a thickness 9 ranging from 2 to 5 μm, for example 4 μm.

In an alternative form (not represented), the second outer structure 2 is a varnish capable of being directly attached to the metal layer 4.

The metal layer 4 disclosed herein can be made of iron, steel, nickel, copper, tin, bronze, brass, aluminium, and the like. In certain embodiments, the metal sheet 4 is made of aluminium having a degree of purity ranging from 99.95% to 97% by weight, the remainder being inevitable impurities and/or alloying elements. Examples of alloys are those having aluminium as the main component and Fe, Si, Mg, Mn, Ti, and/or Cu as alloying elements, such as, for example, the alloys AlFe1.5Mn, AlFeSi, and AlFeSiMn, respectively having a purity of greater than 97.5%, such as greater than 98.5%, by weight of aluminium.

For example, the metal layer 4 may be made of aluminium and may have a thickness 10 ranging from 6 to 12 μm, such as 12 μm.

The faces 11 and 12 of the metal layer 4 can exhibit an improved adhesion for the bonding agent by virtue of a pretreatment aimed, for example, at increasing the surface tension of these faces 11 and 12, for example brushing, chromating, ionization treatment, ozone treatment, corona treatment, flame treatment, and/or plasma treatment.

The layer 5 of bonding agent comprises a copolymer comprising at least 7% by weight of at least one unit chosen from carboxylic units and carboxylate units, wherein the carboxylic units may be in acid form or in salt form. For example, the carboxylic units and/or carboxylate units may be present in an amount ranging from 7% to 19%, such as 9.7%, by weight, relative to the total weight of the copolymer.

For example, the layer 5 may be a copolymer which comprises at least one first monomer according to the following unit $(-CH_2-CR_3COOR_2-)_m$ wherein $R_3$ is chosen from H and $CH_3$, $R_2$ is chosen from H and linear or branched unsubstituted alkyl groups, such as methyl, ethyl, propyl, and isobutyl groups, or $R_2$ is chosen from $C_1$ to $C_4$ cycloalkyl groups, and wherein m is chosen in such a way that this first monomer is present in an amount ranging from 7 to 19% by weight relative to the total weight of the copolymer.

In certain embodiments, this copolymer comprises at least one second monomer formed of an alkylene unit comprising from 1 to 10 carbon atoms and for example exhibiting an ethylene unit according to the following formula:

$(-CH_2-CH_2-)_n$ wherein n is chosen in such a way that this second monomer is present in an amount ranging from 71 to 92% by weight relative to the total weight of the copolymer.

In certain embodiments, the copolymer forming the layer 5 is a copolymer of ethylene and of ethyl acrylate comprising 9.7% by weight of ethyl acrylate and/or a copolymer of ethylene and of acrylic acid comprising 9.7% by weight of acrylic acid. The layer 5 may have a thickness 13 ranging from 10 to 40 μm, such as 25 μm.

Finally, this layer 5 of bonding agent may be used to attach the metal layer 4 to the first outer structure 6, the latter optionally being made of a non-metallic material, such as of a thermoplastic of the same type as the examples given above for the second outer structure 2. The first outer structure 6 can itself be produced from one or more layers attached to one another and made of materials which are optionally distinct from one another.

In certain other embodiments, the first outer structure 6 forms a polyethylene layer. Furthermore, it may have a thickness 14 ranging from 40 to 150 μm, such as 75 μm.

The layers and/or structures 2, 3, 5, and 6 can be transparent, translucent, or opaque and can be clear, partially colored, or completely colored.

At least one of the outer faces chosen from 15 and 16 of the material 1, respectively represented by the outer structures 2 and 6, can be covered by a printed design, itself optionally covered by a lacquer. These outer faces chosen from 15 and 16 can also be provided with a lacquer, it also being possible, as the case may be, for this lacquer to be printed and/or to be capable of being printed on the wrapping, for example using UV radiation, solvents, laser beams, or electron beams.

In the case where the outer layers or structures are made of plastics, they can be extruded. For example, the material 1 may be obtained by laminating the layers over one another.

According to one embodiment of the material 1, this material 1 can also comprise an arrangement of layers and/or structures which are symmetrical with respect to one another on either side of the metal layer 4.

In certain embodiments, this material 1 can be produced in the form of an endless material, such as rolls, and can be subsequently cut into sections to be assembled so as to form packaging devices.

As a further example, the material 1 may be used to contribute to the packaging of cosmetic products, such as compositions for the dyeing of keratinous fibers, such as compositions for oxidation dyeing comprising at least one basifying agent.

Mention may be made, as examples of basifying agents, of aqueous ammonia; alkaline carbonates; alkanolamines, such as mono-, di-, and triethanolamines and their derivatives; sodium hydroxide; potassium hydroxide; and the compounds of following formula (II):

(II)

in which W is a propylene residue optionally substituted by a group chosen from hydroxyl groups and $C_1$-$C_4$ alkyl radicals, and $R_a$, $R_b$, $R_c$, and $R_d$, which are identical or different, are chosen from hydrogen atoms, $C_1$-$C_4$ alkyl radicals, and $C_1$-$C_4$ hydroxyalkyl radicals.

According to one embodiment, the at least one basifying agent is chosen from aqueous ammonia and ethanolamine.

Conventionally, compositions for the oxidation dyeing of keratinous fibers, such as human hair, comprise, in an appropriate medium, at least one oxidation base and optionally at least one coupler.

Mention may be made, as oxidation bases, of para-phenylenediamines, bisphenylalkylenediamines, para-aminophenols, bis-para-aminophenols, ortho-amino-phenols, heterocyclic bases, and the addition salts thereof.

Mention may be made, among para-phenylenediamines, by way of example, of para-phenylenediamine, para-toluenediamine, 2-chloro-para-phenylenediamine, 2,3-dimethyl-para-phenylenediamine, 2,6-dimethyl-para-phenylenediamine, 2,6-diethyl-para-phenylenediamine, 2,5-dimethyl-para-phenylenediamine, N,N-dimethyl-para-phenylenediamine, N,N-diethyl-para-phenylenediamine, N,N-dipropyl-para-phenylenediamine, 4-amino-N,N-diethyl-3-methylaniline, N,N-bis(β-hydroxyethyl)-para-phenylenediamine, 4-N,N-bis(β-hydroxyethyl)amino-2-methylaniline, 4-N,N-bis(β-hydroxyethyl)amino-2-chloroaniline, 2-(β-hydroxyethyl)-para-phenylenediamine, 2-fluoro-para-phenylenediamine, 2-isopropyl-para-phenylenediamine, N-(β-hydroxypropyl)-para-phenylenediamine, 2-hydroxymethyl-para-phenylenediamine, N,N-dimethyl-3-methyl-para-phenylenediamine, N,N-(ethyl, β-hydroxyethyl)-para-phenylenediamine, N-(β,γ-dihydroxypropyl)-para-phenylenediamine, N-(4'-aminophenyl)-para-phenylenediamine, N-phenyl-para-phenylenediamine, 2-(β-hydroxyethyloxy)-para-phenylenediamine, 2-(β-acetylaminoethyloxy)-para-phenylenediamine, N-(β-methoxyethyl)-para-phenylenediamine, 4-aminophenylpyrrolidine, 2-thienyl-para-phenylenediamine, 2-(β-hydroxyethylamino)-5-aminotoluene, 3-hydroxy-1-(4'-aminophenyl)pyrrolidine, and the acid addition salts thereof.

Among the para-phenylenediamines mentioned above, para-phenylenediamine, para-toluenediamine, 2-isopropyl-para-phenylenediamine, 2-(β-hydroxyethyl)-para-phenylenediamine, 2-(β-hydroxyethyloxy)-para-phenylenediamine, 2,6-dimethyl-para-phenylenediamine, 2,6-diethyl-para-phenylenediamine, 2,3-dimethyl-para-phenylenediamine, N,N-bis(β-hydroxyethyl)-para-phenylenediamine, 2-chloro-para-phenylenediamine, 2-(β-acetylaminoethyloxy)-para-phenylenediamine, and the acid addition salts thereof may be mentioned.

Mention may be made, among bisphenylalkylenediamines, by way of example, of N,N'-bis(β-hydroxyethyl)-N,N'-bis(4'-aminophenyl)-1,3-diaminopropanol, N,N'-bis(β-hydroxyethyl)-N,N'-bis(4'-aminophenyl) ethylenediamine, N,N'-bis(4-aminophenyl) tetramethylenediamine, N,N'-bis(β-hydroxyethyl)-N,N'-bis(4-amino-phenyl)tetramethylenediamine, N,N'-bis(4-methylaminophenyl)tetramethylenediamine, N,N'-bis(ethyl)-N,N'-bis(4'-amino-3'-methylphenyl) ethylenediamine, 1,8-bis(2,5-diaminophenoxy)-3,6-dioxaoctane, and the acid addition salts thereof.

Mention may be made, among para-aminophenols, by way of example, of para-aminophenol, 4-amino-3-methylphenol, 4-amino-3-chlorophenol, 4-amino-2-chlorophenol, 4-amino-3-fluorophenol, 4-amino-3-(hydroxymethyl)phenol, 4-amino-2-methylphenol, 4-amino-2-(hydroxymethyl)phenol, 4-amino-2-(methoxymethyl)phenol, 4-amino-2-(aminomethyl)phenol, 4-amino-2-((β-hydroxyethyl)aminomethyl)phenol, 4-amino-2-fluorophenol, and the acid addition salts thereof.

Mention may be made, among ortho-aminophenols, by way of example, of 2-aminophenol, 2-amino-5-methylphenol, 2-amino-6-methylphenol, 5-acetamido-2-aminophenol, and the acid addition salts thereof.

Mention may be made, among heterocyclic bases, by way of example, of pyridine derivatives, pyrimidine derivatives, pyrazole derivatives, indole derivatives, and indoline derivatives.

Mention may be made, among pyridine derivatives, of the compounds disclosed, for example, in British Patent Nos. GB 1 026 978 and GB 1 153 196, as well as 2,5-diaminopyridine, 2-[(4-methoxyphenyl)amino]-3-aminopyridine, 2,3-diamino-6-methoxypyridine, 2-[(β-methoxyethyl)amino]-3-amino-6-methoxypyridine, 3,4-diaminopyridine, and the acid addition salts thereof.

Other pyridine oxidation bases that may be used according to certain embodiments disclosed herein are the 3-aminopyrazolo[1,5-a]pyridine oxidation bases and the addition salts thereof disclosed, for example, in French Patent Application FR 2 801 308. Mention may be made, by way of example, of pyrazolo[1,5-a]pyridin-3-ylamine; 2-(acetylamino)pyrazolo[1,5-a]pyridin-3-ylamine; 2-(morpholin-4-yl)-pyrazolo[1,5-a]pyridin-3-ylamine; 3-aminopyrazolo[1,5-a]pyridine-2-carboxylic acid; 2-methoxypyrazolo[1,5-a]pyridin-3-ylamine; (3-aminopyrazolo[1,5-a]pyridin-7-yl) methanol; 2-(3-aminopyrazolo[1,5-a]pyridin-5-yl)ethanol; 2-(3-aminopyrazolo[1,5-a]pyridin-7-yl)ethanol; (3-aminopyrazolo[1,5-a]pyridin-2-yl)methanol; 3,6-diaminopyrazolo[1,5-a]pyridine; 3,4-diaminopyrazolo[1,5-a]pyridine; pyrazolo[1,5-a]pyridine-3,7-diamine; 7-(morpholin-4-yl) pyrazolo[1,5-a]pyridin-3-ylamine; pyrazolo[1,5-a]pyridine-3,5-diamine; 5-(morpholin-4-yl)pyrazolo[1,5-a]pyridin-3-ylamine; 2-[(3-aminopyrazolo[1,5-a]pyridin-5-yl)(2-hydroxyethyl)amino]ethanol; 2-[(3-aminopyrazolo[1,5-a]pyridin-7-yl) (2-hydroxyethyl)amino]ethanol; 3-aminopyrazolo[1,5-a]pyridin-5-ol; 3-aminopyrazolo[1,5-a]pyridin-4-ol; 3-aminopyrazolo[1,5-a]pyridin-6-ol; 3-aminopyrazolo[1,5-a]pyridin-7-ol; and the acid and base addition salts thereof.

Mention may be made, among pyrimidine derivatives, of the compounds disclosed, for example, in Patents DE 23 59 399; JP 88-169571; JP 05-63124; and EP 0 770 375, and Patent Application WO 96/15765, such as 2,4,5,6-tetraminopyrimidine, 4-hydroxy-2,5,6-triaminopyrimidine, 2-hydroxy-4,5,6-triaminopyrimidine, 2,4-dihydroxy-5,6-diaminopyrimidine, 2,5,6-triaminopyrimidine, and pyrazolopyrimidine derivatives, such as those mentioned in French Patent Application FR A 2 750 048 and among which may be mentioned pyrazolo[1,5-a]pyrimidine-3,7-diamine; 2,5-dimethylpyrazolo[1,5-a]pyrimidine-3,7-diamine; pyrazolo[1,5-a]pyrimidine-3,5-diamine; 2,7-dimethylpyrazolo[1,5-a]pyrimidine-3,5-diamine; 3-aminopyrazolo[1,5-a]pyrimidin-7-ol; 3-aminopyrazolo[1,5-a]pyrimidine-5-ol; 2-(3-aminopyrazolo[1,5-a]pyrimidin-7-ylamino)ethanol; 2-(7-aminopyrazolo[1,5-a]pyrimidin-3-ylamino)ethanol; 2-[(3-aminopyrazolo[1,5-a]pyrimidin-7-yl)(2-hydroxyethyl) amino]ethanol; 2-[(7-aminopyrazolo[1,5-a]pyrimidin-3-yl) (2-hydroxyethyl)amino]ethanol; 5,6-dimethylpyrazolo[1,5-a]pyrimidine-3,7-diamine; 2,6-dimethylpyrazolo[1,5-a]pyrimidine-3,7-diamine; 2,5,N7,N7-tetramethylpyrazolo[1,5-a]pyrimidine-3,7-diamine; 3-amino-5-methyl-7-(imidazolylpropylamino)pyrazolo[1,5-a]pyrimidine; the acid addition salts thereof; and the tautomeric forms thereof, when a tautomeric equilibrium exists.

Mention may be made, among pyrazole derivatives, of the compounds disclosed in German Patents DE 38 43 892 and DE 41 33 957 and Patent Applications WO 94/08969, WO 94/08970, FR A 2 733 749, and DE 195 43 988, such as 4,5-diamino-1-methylpyrazole, 4,5-diamino-1-(β-hydroxyethyl)pyrazole, 3,4-diaminopyrazole, 4,5-diamino-1-(4'-chlorobenzyl)pyrazole, 4,5-diamino-1,3-dimethylpyrazole, 4,5-diamino-3-methyl-1-phenylpyrazole, 4,5-diamino-1-methyl-3-phenylpyrazole, 4-amino-1,3-dimethyl-5-hydrazinopyrazole, 1-benzyl-4,5-diamino-3-methylpyrazole, 4,5-diamino-3-(tert-butyl)-1-methylpyrazole, 4,5-diamino-1-(tert-butyl)-3-methylpyrazole, 4,5-diamino-1-(β-hydroxyethyl)-3-methylpyrazole, 4,5-diamino-1-ethyl-3-methylpyrazole, 4,5-diamino-1-ethyl-3-(4'-methoxyphenyl) pyrazole, 4,5-diamino-1-ethyl-3-(hydroxymethyl)pyrazole, 4,5-diamino-3-hydroxymethyl-1-methylpyrazole, 4,5-diamino-3-hydroxymethyl-1-isopropylpyrazole, 4,5-diamino-3-methyl-1-isopropylpyrazole, 4-amino-5-(2'-aminoethyl) amino-1,3-dimethylpyrazole, 3,4,5-triaminopyrazole, 1-methyl-3,4,5-triaminopyrazole, 3,5-diamino-1-methyl-4-(methylamino)pyrazole, 3,5-diamino-4-(β-hydroxyethyl) amino-1-methylpyrazole, and the acid addition salts thereof.

Mention may be made, among indole and indoline derivatives, of the compounds disclosed in German Patent DE 102 40 758, such as 5,6-dihydroxyindole and 5,6-dihydroxyindoline.

The at least one oxidation base may be present in an amount ranging from 0.001 to 10% by weight relative to the total weight of the dyeing composition, such as from 0.005 to 6%.

Mention may be made, as the at least one coupler present in the dyeing composition, of meta-phenylenediamines, meta-aminophenols, meta-diphenols, naphthalene couplers, heterocyclic couplers, and the addition salts thereof.

Mention may be made, by way of example, of 2-methyl-5-aminophenol, 5-N-(β-hydroxyethyl)amino-2-methylphenol, 6-chloro-2-methyl-5-aminophenol, 3-aminophenol, 1,3-dihydroxybenzene, 1,3-dihydroxy-2-methylbenzene, 4-chloro-1,3-dihydroxybenzene, 2,4-diamino-1-(β-hydroxyethyloxy)benzene, 2-amino-4-(β-hydroxyethylamino)-1-methoxybenzene, 1,3-diaminobenzene, 1,3-bis(2,4-diaminophenoxy)propane, 3-ureidoaniline, 3-ureido-1-dimethylaminobenzene, sesamol, 1-β-hydroxyethylamino-3,4-methylenedioxybenzene, α-naphthol, 2-methyl-1-naphthol, 6-hydroxyindole, 4-hydroxyindole, 4-hydroxy-N-methylindole, 2-amino-3-hydroxypyridine, 6-hydroxybenzomorpholine, 3,5-diamino-2,6-dimethoxypyridine, 1-N-(β-hydroxyethyl)amino-3,4-methylenedioxybenzene, 2,6-bis-(β-hydroxyethylamino)toluene, and the acid addition salts thereof.

In the composition disclosed herein, the at least one coupler may be present in an amount ranging from 0.001 to 10% by weight relative to the total weight of the dyeing composition, such as from 0.005 to 6%.

Generally, the addition salts of the at least one oxidation base and at least one coupler which can be used in accordance with certain embodiments may be chosen from the acid addition salts, such as hydrochlorides, hydrobromides, sulphates, citrates, succinates, tartrates, lactates, tosylates, benzenesulphonates, phosphates, and acetates, and the base addition salts, such as sodium hydroxide, potassium hydroxide, aqueous ammonia, amines, and alkanolamines.

The dyeing composition can additionally comprise at least one direct dye. The at least one direct dye that may be used according to certain embodiments may be chosen, for example, from neutral, acid, or cationic nitrobenzene direct dyes; neutral, acid, or cationic azo direct dyes; neutral, acid, or cationic quinone; and, for example, anthraquinone direct dyes, azine direct dyes, triarylmethane direct dyes, indoamine direct dyes, and natural direct dyes.

Mention may be made, among benzene direct dyes, without implied limitation, of the following compounds:

1,4-diamino-2-nitrobenzene, 1-amino-2-nitro-4-(β-hydroxyethylamino)benzene, 1-amino-2-nitro-4-(bis(β-hydroxyethyl)amino)benzene, 1,4-bis(β-hydroxyethylamino)-2-nitrobenzene, 1-(β-hydroxyethylamino)-2-nitro-4-(bis(β-hydroxyethyl)amino)benzene, 1-(β-hydroxyethylamino)-2-nitro-4-aminobenzene, 1-(β-hydroxyethylamino)-2-nitro-4-((ethyl)(β-hydroxyethyl)amino)benzene, 1-amino-3-methyl-4-(β-hydroxyethylamino)-6-nitrobenzene, 1-amino-2-nitro-4-(β-hydroxyethylamino)-5-chlorobenzene, 1,2-diamino-4-nitrobenzene, 1-amino-2-(β-hydroxyethylamino)-5-nitrobenzene, 1,2-bis(β-hydroxyethylamino)-4-nitrobenzene, 1-amino-2-(tris(hydroxymethyl)methylamino)-5-nitrobenzene, 1-hydroxy-2-amino-5-nitrobenzene, 1-hydroxy-2-amino-4-nitrobenzene, 1-hydroxy-3-nitro-4-aminobenzene, 1-hydroxy-2-amino-4,6-dinitrobenzene, 1-(β-hydroxyethyloxy)-2-(β-hydroxyethylamino)-5-nitrobenzene, 1-methoxy-2-(β-hydroxyethylamino)-5-nitrobenzene, 1-(β-hydroxyethyloxy)-3-methylamino-4-nitrobenzene, 1-(β,γ-dihydroxypropyloxy)-3-methylamino-4-nitrobenzene, 1-(β-hydroxyethylamino)-4-(β,γ-dihydroxypropyloxy)-2-nitrobenzene, 1-(β,γ-dihydroxypropylamino)-4-trifluoromethyl-2-nitrobenzene, 1-(β-hydroxyethylamino)-4-trifluoromethyl-2-nitrobenzene, 1-(β-hydroxyethylamino)-3-methyl-2-nitrobenzene, 1-(β-aminoethylamino)-5-methoxy-2-nitrobenzene, 1-hydroxy-2-chloro-6-ethylamino-4-nitrobenzene, 1-hydroxy-2-chloro-6-amino-4-nitrobenzene, 1-hydroxy-6-(bis(β-hydroxyethyl)amino)-3-nitrobenzene, 1-(β-hydroxyethylamino)-2-nitrobenzene, and 1-hydroxy-4-(β-hydroxyethylamino)-3-nitrobenzene.

Mention may be made, among azo direct dyes, of the cationic azo dyes disclosed in Patent Applications WO 95/15144, WO 95/01772, and EP 714 954, the content of which is incorporated by reference herein.

Mention may also be made, among these compounds, of the following dyes:

1,3-dimethyl-2-[[4-(dimethylamino)phenyl]azo]-1H-imidazolium chloride, 1,3-dimethyl-2-[(4-aminophenyl)azo]-1H-imidazolium chloride, and 1-methyl-4-[(methylphenylhydrazono)methyl]pyridinium methyl sulphate.

Mention may also be made, among azo direct dyes, of the following dyes, described in the Colour Index International, 3rd edition:

Disperse Red 17, Acid Yellow 9, Acid Black 1, Basic Red 22, Basic Red 76, Basic Yellow 57, Basic Brown 16, Acid Yellow 36, Acid Orange 7, Acid Red 33, Acid Red 35, Basic Brown 17, Acid Yellow 23, Acid Orange 24, and Disperse Black 9.

Mention may also be made of 1-(4'-aminodiphenylazo)-2-methyl-4-(bis(β-hydroxyethyl)amino)benzene and 4-hydroxy-3-(2-methoxyphenylazo)-1-naphthalenesulphonic acid.

Mention may be made, among quinone direct dyes, of the following dyes:

Disperse Red 15, Solvent Violet 13, Acid Violet 43, Disperse Violet 1, Disperse Violet 4, Disperse Blue 1, Disperse Violet 8, Disperse Blue 3, Disperse Red 11, Acid Blue 62, Disperse Blue 7, Basic Blue 22, Disperse Violet 15, Basic Blue 99, and the following compounds:

1-N-methylmorpholiniumpropylamino-4-hydroxyanthraquinone, 1-aminopropylamino-4-(methylamino)anthraquinone, 1-(aminopropylamino)anthraquinone, 5-(β-hydroxyethyl)-1,4-diaminoanthraquinone, 2-(aminoethylamino)anthraquinone, and 1,4-bis(β,γ-dihydroxypropylamino)anthraquinone.

Mention may be made, among azine dyes, of the following compounds:

Basic Blue 17 and Basic Red 2.

Mention may be made, among triarylmethane dyes, of the following compounds:

Basic Green 1, Acid Blue 9, Basic Violet 3, Basic Violet 14, Basic Blue 7, Acid Violet 49, Basic Blue 26, and Acid Blue 7.

Mention may be made, among indoamine dyes, of the following compounds:

2-(β-hydroxyethylamino)-5-[4'-(bis(β-hydroxyethyl)amino) anilino]-1,4-benzoquinone,
2-(β-hydroxyethylamino)-5-(2'-methoxy-4'-aminoanilino)-1,4-benzoquinone,
3-[N-(2'-chloro-4'-hydroxyphenyl)acetylamino]-6-methoxy-1,4-benzoquinone imine,
3-[N-[3'-chloro-4'-(methylamino)phenyl]ureido]-6-methyl-1,4-benzoquinone imine, and
3-[[4'-[N-(ethyl, carbamylmethyl)amino]phenyl]ureido]-6-methyl-1,4-benzoquinone, imine.

The at least one direct dye may be present in an amount ranging from 0.001 to 20% by weight relative to the total weight of the composition (which may be ready-to-use), such as from 0.005 to 10% by weight.

At the time of use, the oxidation dyeing composition as defined above may be mixed with at least one oxidizing agent, such as hydrogen peroxide; persalts, such as persulphates; and oxidase enzymes, such as uricase and laccase.

According to one embodiment, the composition is a direct dyeing composition, that is to say devoid of oxidation base and of coupler, comprising at least one direct dye as defined above in a cosmetic medium comprising at least one basifying agent. This composition can additionally comprise at least one oxidizing agent, such as hydrogen peroxide, before obtaining lightening of the keratinous fibers.

The medium appropriate for dyeing, also referred to as dyeing vehicle, is generally composed of water or of a mixture of water and of at least one organic solvent in order to dissolve the compounds which would not be sufficiently soluble in water. Mention may be made, as the at least one organic solvent, for example, of lower $C_1$-$C_4$ alkanols, such as ethanol; isopropanol; polyols and polyol ethers, such as 2-butoxyethanol, propylene glycol, propylene glycol monomethyl ether, diethylene glycol monoethyl ether, and diethylene glycol monomethyl ether; and aromatic alcohols, such as benzyl alcohol and phenoxyethanol.

The at least one organic solvent may be present in an amount ranging from 1 to 40% by weight relative to the total weight of the dyeing composition, such as from 5 to 30% by weight.

The dyeing composition disclosed herein can also include various adjuvants conventionally used in compositions for dyeing the hair, such as anionic, cationic, nonionic, amphoteric, or zwitterionic surface-active agents and mixtures thereof; anionic, cationic, nonionic, amphoteric, or zwitterionic polymers and mixtures thereof; inorganic or organic thickening agents such asr anionic, cationic, nonionic, and amphoteric polymeric associative thickeners; antioxidants; penetration agents; sequestering agents; fragrances; buffers; dispersing agents; conditioning agents, such as, for example, volatile or nonvolatile and modified or unmodified silicones; film-forming agents; ceramides; preservatives; and opacifying agents.

The above adjuvants may be present in an amount, for each of them, ranging from 0.01 to 20% by weight relative to the total weight of the composition.

The dyeing composition can be provided in various forms, such as in the form of liquids, creams, gels, and in any other form appropriate for carrying out dyeing of keratinous fibers, such as human hair.

Figures 2, 3:
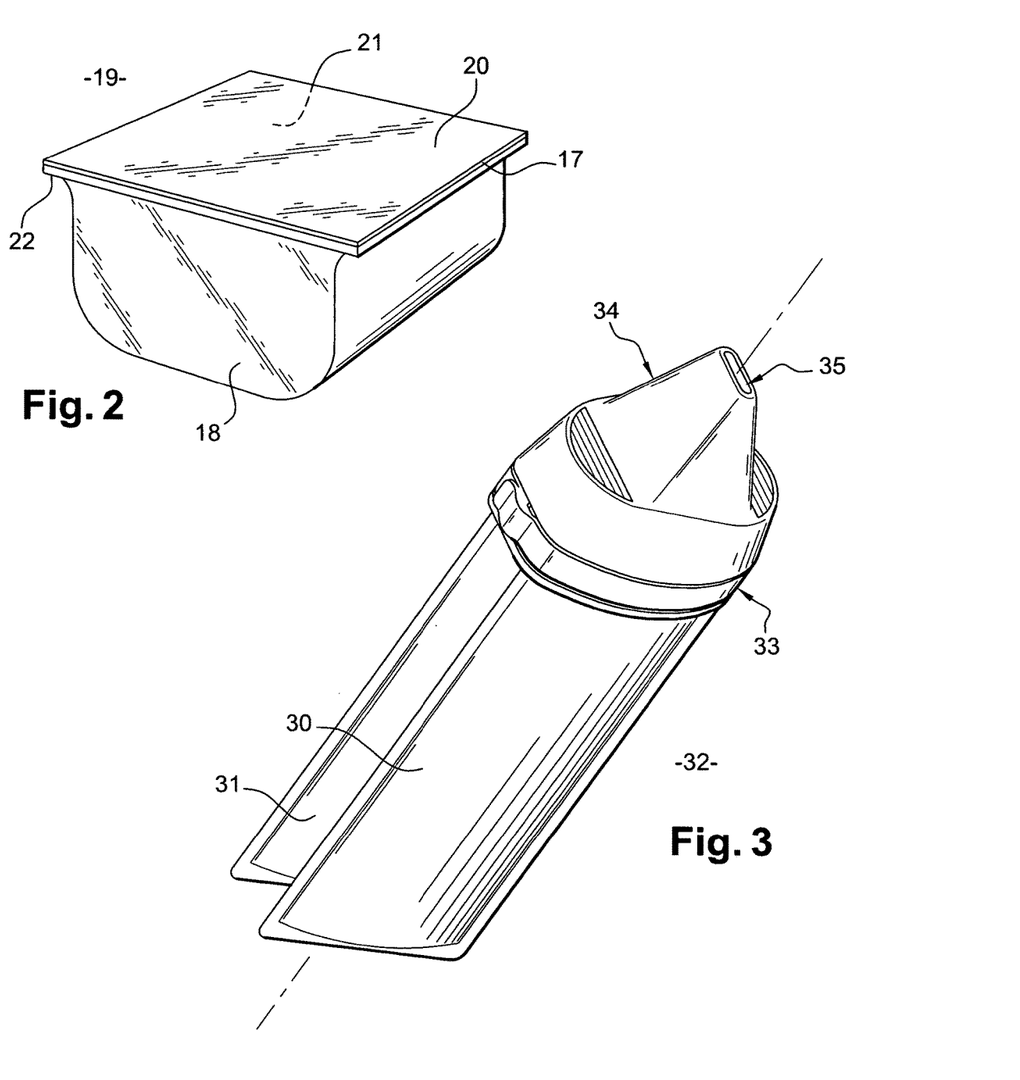
FIG. 2: a perspective view of a first packaging device as disclosed herein.
FIG. 3: a perspective view of a second packaging device as disclosed herein.

In the embodiment presented in FIG. 2, for example, a flexible sheet 17 formed from the material 1 is sealed via the first outer structure 6, which comprises, for example, polyolefins or is made of polyolefins, to a bottom part 18, so as to form a lid of the said bottom part 18, the whole delimiting a housing for a packaging device 19 suitable for holding a cosmetic product, such as a composition for dyeing keratinous fibers.

In fact, an outer face 20 of this lid is formed by the second outer structure 2 of the material 1 forming the flexible sheet 17, while the first outer structure 6 of the material 1 forms an inner face 21 delimiting at least in part the said housing, this inner face 21 being brought into contact with the product.

For example, the bottom part 18 is made of a rigid material embossed so as to exhibit a hollow delimiting in part the housing, this hollow being capable of holding an amount of product and of resting, via this bottom part, on a flat surface. For example, the flexible sheet 17 is sealed to a shoulder 22 of the bottom part 18, this shoulder 22 delimiting an opening of the housing closed off by the flexible sheet 17.

All known processes (such as heat sealing, ultrasound, induction heating, and high frequency heating) are suitable for the closing off (sealing). In certain embodiments, this closing off provides hermetic closure of the packaging device 19, the product being hermetically present in the housing. The opening of such a device thus closed can be carried out, for example, by cutting, peeling, tearing, or piercing, the flexible sheet 17.

In an alternative form, represented in FIG. 3, the material 1 is used to produce at least one of the sachets 30 and 31 possessing flexible sheets of a packaging device 32 as disclosed, for example, in French Patent FR 2 830 520, incorporated herein by reference. For example, such a device 32 is designed for the joint dispensing of first and second products packaged separately in the sachets 30 and 31, these sachets being fitted into a stage 33, such that a dispensing means 34 of the device 32 is movable with respect to this stage 33. The device 32 is configured so as to make possible the irreversible change from a first configuration, in which the first and second sachets are isolated from at least one dispensing orifice 35 formed by the dispensing means 34, to a second configuration, in which the first and second containers are in communication with the dispensing orifice 35.

According to one embodiment, the sachets 30 and 31 of the material 1, are formed by two sheets of the same size cut out from the material 1, these two sheets subsequently being superimposed and attached to one another along their periphery. The sheets are attached to one another so that the second outer structure 2 defines the outer perimeter of the sachet, while the first outer structure 6 defines the inner perimeter of the sachet intended to be brought into contact with the product.

Alternatively, such a sachet can be obtained by folding over itself a sheet cut out from the material 1, in such a way that two regions of this sheet, folded over one another, are attached to one another along their periphery. Here again, the sheet is arranged in such a way that the first outer structure 6 defines an inner perimeter of the sachet thus formed.

Figure 4:
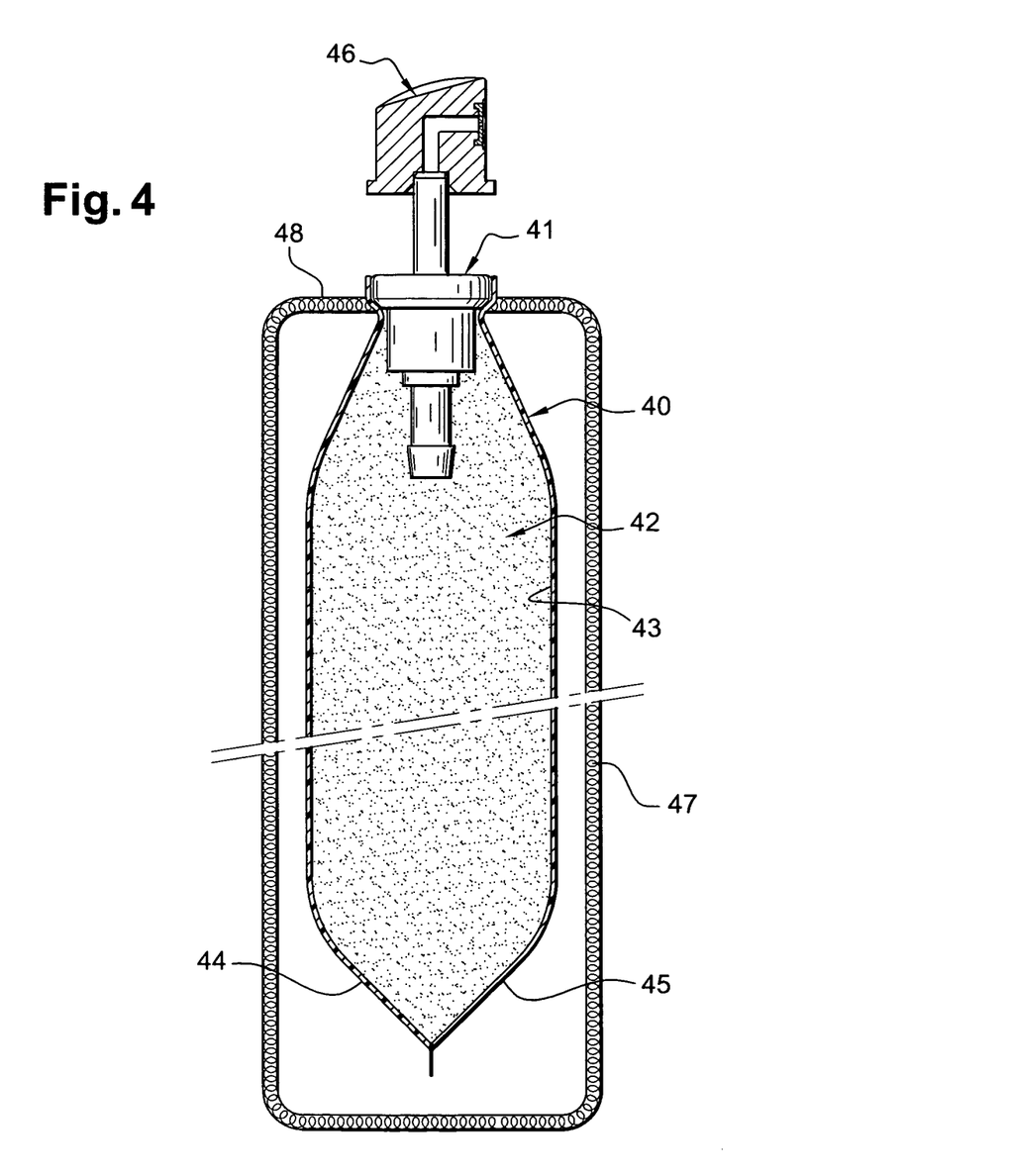
FIG. 4: a sectional view of a third packaging device as disclosed herein.

In FIG. 4, a sachet 40, such as the sachets 30 and 31, is equipped with an airless pump 41 such that the actuating of this pump 41 makes possible the dispensing of the product present in the housing 42 delimited by the inner perimeter 43 of the sachet. For example, the pump 41 may be installed between two sheets, 44 and 45 respectively, cut out from the material 1 in order to form the said sachet 40, the inner perimeter 43 of the sachet being formed by the respective first outer structures, such as 6, of these two sheets. In certain embodiments, these first outer structures, such as 6, are welded in a leak-tight manner to the outer perimeter of the body of the pump 41, so as to provide a leak-tight assembly.

The sheets 44 and 45 cut out from the material 1 may be flexible, thus conferring flexible walls on the sachet, the walls of the sachet then being crushed on themselves, and the sachet is emptied by the actuation of the pump 41. As the pump 41 is airless, the dispensing of product results in a gradual reduction in the internal volume of the housing 42, the sheets 44 and 45 collapsing on one another.

In certain embodiments, the pump 41 can be equipped with an actuating means 46 which may make it possible to facilitate the manual actuation of the pump for the purpose of dispensing the product.

The sachet 40 may be positioned in a rigid frame 47 so as to be able to be stored vertically and thus to improve the emptying of the sachet 40. The rigid frame 47 is produced, for example, from material such as board. It defines an internal volume capable of receiving the sachet 40 so that the latter is suspended from an upper plate 48 and spreads out inside the frame without being subjected therein to a stress exerted on its outer perimeter.

In an alternative form (not represented), the pump 41 can be replaced in a sachet such as 40 by a body comprising a passage for making possible the dispensing of product, the sheets 44 and 45 then being welded to the outer perimeter of this body.

For example, this body may constitute a connecting means capable of being fitted to a means for dispensing the product enclosed in the device. For example, the body is equipped with a valve which closes off the passage in a leak-tight manner, it being possible for this valve to be opened when the said sachet is fitted to the dispensing means.

In an alternative form, this passage can be closed off with a stopper and the departure of the product from such a sachet 40 can then be obtained by simple pressure exerted by the user on the outer perimeter of the sachet after having detached the stopper from its body.

As used herein, the expression "comprising a" should be regarded as being synonymous with "comprising at least one", unless otherwise specified.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

What is claimed is:

1. A packaging device comprising:
   i) at least one flexible sheet delimiting at least in part a housing, the said flexible sheet forming a multilayer complex comprising:
      a) at least one metal layer;
      b) at least one layer containing as the only bonding agent a copolymer consisting of ethylene and from 7% to 19% by weight of at least one member selected from the group consisting of acrylic acid and methacrylic acid; and
      c) at least one layer of a non-metallic material bonded to the at least one metal layer via the bonding agent; and
   ii) at least one cosmetic composition for hair coloration positioned inside the housing;
   wherein the cosmetic composition for hair coloration comprises a hair oxidation dyeing agent and the dying agent comprises an oxidation dyeing agent comprising an oxidation base selected from the group consisting of para-phenylenediamines, bisphenylalkylenediamines, paraaminophenols, bis-para-aminophenols, ortho-amino-phenols, heterocyclic bases, and the addition salts thereof and the at least one oxidation base is present in an amount ranging from 0.001 to 10% by weight relative to the total weight of the cosmetic composition;
   and wherein the at least one flexible sheet has a thickness ranging from 70 to 232 µm, such that the at least one metal layer has a thickness ranging from 6 to 25 µm, the at least one layer of the bonding agent has a thickness ranging from 10 to 40 µm, and the at least one layer of a non-metallic material has a thickness ranging from 40 to 150 µm.

2. The packaging device according to claim 1, wherein the bonding agent comprises from 8.5% to 10.5% by weight of acrylic acid.

3. The packaging device according to claim 2, wherein the bonding agent comprises 9.7% by weight of acrylic acid.

4. The packaging device according to claim 1, wherein the at least one layer of a non-metallic material is made of at least one thermoplastic.

5. The packaging device according to claim 4, wherein the at least one thermoplastic is a polymer.

6. The packaging device according to claim 5, wherein the polymer is polyethylene.

7. The packaging device according to claim 1, wherein the at least one metal layer is made of aluminum or of an alloy comprising aluminum.

8. The packaging device according to claim 1, wherein the at least one metal layer has a thickness ranging from 6 to 12 µm.

9. The packaging device according to claim 8, wherein the at least one metal layer has a thickness of 12 µm.

10. The packaging device according to claim 1, wherein the at least one layer of at least one bonding agent has a thickness of 25 µm.

11. The packaging device according to claim 1, wherein the at least one layer of non-metallic material has a thickness of 75 µm.

12. The packaging device according to claim 1, further comprising an outer structure attached to the at least one metal layer so as to form an outer face directed towards the outside of the housing, this outer structure being made of at least one thermoplastic.

13. The packaging device according to claim 12, wherein the at least one thermoplastic is a polymer.

14. The packaging device according to claim 13, wherein the polymer is poly(ethylene terephthalate).

15. The packaging device according to claim 12, wherein the outer structure is attached to the at least one metal layer via a layer of at least one second bonding agent.

16. The packaging device according to claim 15, wherein the at least one second bonding agent is chosen from polyurethane based adhesives.

17. The packaging device according to claim 15, wherein the layer of at least one second bonding agent has a thickness ranging from 2 to 5 µm.

18. The packaging device according to claim 17, wherein the layer of second bonding agent has a thickness of 4 µm.

19. The packaging device according to claim 12, wherein the outer structure has a thickness ranging from 12 to 25 µm.

20. The packaging device according to claim 19, wherein the outer structure has a thickness of 12 µm.

21. The packaging device according to claim 1, wherein the at least one flexible sheet is obtained by laminating.

22. The packaging device according to claim 1, wherein the at least one bonding agent is extruded.

23. The packaging device according to claim 1, wherein the at least one flexible sheet is at least in part deformable elastically.

24. The packaging device according to claim 1, further comprising a bottom part exhibiting a housing capable of receiving the at least one cosmetic composition, this bottom part being closed off by the at least one flexible sheet.

25. The packaging device according to claim 24, wherein the bottom part is closed off by the at least one flexible sheet by being sealed over one side of the bottom part, to delimit the housing.

26. The packaging device according to claim 1, wherein the packaging device is in the form of a sachet comprising at least one wall sealed to the at least one flexible sheet to delimit the housing inside which the at least one cosmetic composition is enclosed.

27. The packaging device according to claim 26, wherein the wall is produced from the same material as the at least one flexible sheet.

28. The packaging device according to claim 1, further comprising a dispensing means for dispensing the at least one cosmetic composition enclosed in the packaging device.

29. The packaging device according to claim 28, wherein the dispensing means is an airless pump.

30. The packaging device according to claim 1, wherein the at least one cosmetic composition is alkaline.

31. The packaging device according to claim 1, wherein the at least one cosmetic composition further comprises at least one basifying agent.

32. The packaging device according to claim 31, wherein the at least one basifying agent is chosen from aqueous ammonia, ethanolamine, and sodium silicate.

33. The packaging device according to claim 31, wherein the at least one cosmetic composition further comprises at least one coupler.

34. The packaging device according to claim 31, wherein the at least one cosmetic composition comprises at least one direct dye.

35. The packaging device according to claim 1, further comprising an outer structure attached to the at least one metal layer so as to form an outer face directed towards the outside of the housing, this outer structure being made of poly(ethylene terephthalate); and wherein the outer structure is attached to the at least one metal layer via a layer of a polyurethane based adhesive.

36. The packaging device according to claim 1, wherein said copolymer is a copolymer consisting of ethylene and acrylic acid.

* * * * *